United States Patent [19]
Viksne

[11] Patent Number: 5,368,315
[45] Date of Patent: Nov. 29, 1994

[54] NON-STICK AUTOMOTIVE GASKETS

[75] Inventor: George J. Viksne, Circuito Fuentes del Pedregal, Mexico

[73] Assignee: Wacker Silicones Corporation, Adrian, Mich.

[21] Appl. No.: 997,375

[22] Filed: Dec. 28, 1992

[51] Int. Cl.$^5$ .............................................. F16J 15/10
[52] U.S. Cl. ............................. 277/235 A; 277/235 B; 277/DIG 6
[58] Field of Search ............... 277/233, 235 A, 235 B, 277/DIG. 6

[56] References Cited

U.S. PATENT DOCUMENTS

| | | |
|---|---|---|
| 3,715,334 | 2/1973 | Karstedt . |
| 3,775,452 | 11/1973 | Karstedt . |
| 3,814,730 | 6/1974 | Karstedt . |
| 4,103,913 | 8/1978 | McDowell . |
| 4,169,185 | 9/1979 | Bhatia . |
| 4,220,342 | 9/1980 | Shah ............................ 277/235 AX |
| 4,223,897 | 9/1980 | Staab et al. ....................... 277/235 B |
| 4,483,539 | 11/1984 | Bindel et al. ................ 277/235 B X |
| 4,500,100 | 2/1985 | Bindel et al. ....................... 277/235 B |
| 4,635,948 | 1/1987 | Zerfass et al. .................. 277/233 X |
| 4,681,800 | 7/1987 | Zerfess et al. ............... 277/235 B X |
| 4,741,965 | 5/1988 | Zerfess et al. ............... 277/235 A X |
| 4,826,708 | 5/1989 | Udagawa . |

OTHER PUBLICATIONS

"Encyclopedia of Polymer Science and Engineering"; vol. 15, pp. 204–223, 230–231, 234–289, 294–297; Oct. 19, 1989.

Primary Examiner—William A. Cuchlinski, Jr.
Assistant Examiner—Scott W. Cummings
Attorney, Agent, or Firm—Martin Connaughton

[57] ABSTRACT

A non-stick automotive gasket which comprises a resilient material having a polymeric fluorocarbon coating thereon which is obtained by impregnating the resilient material with a saturant having dispersed therein polymeric fluorocarbon particles.

6 Claims, 2 Drawing Sheets

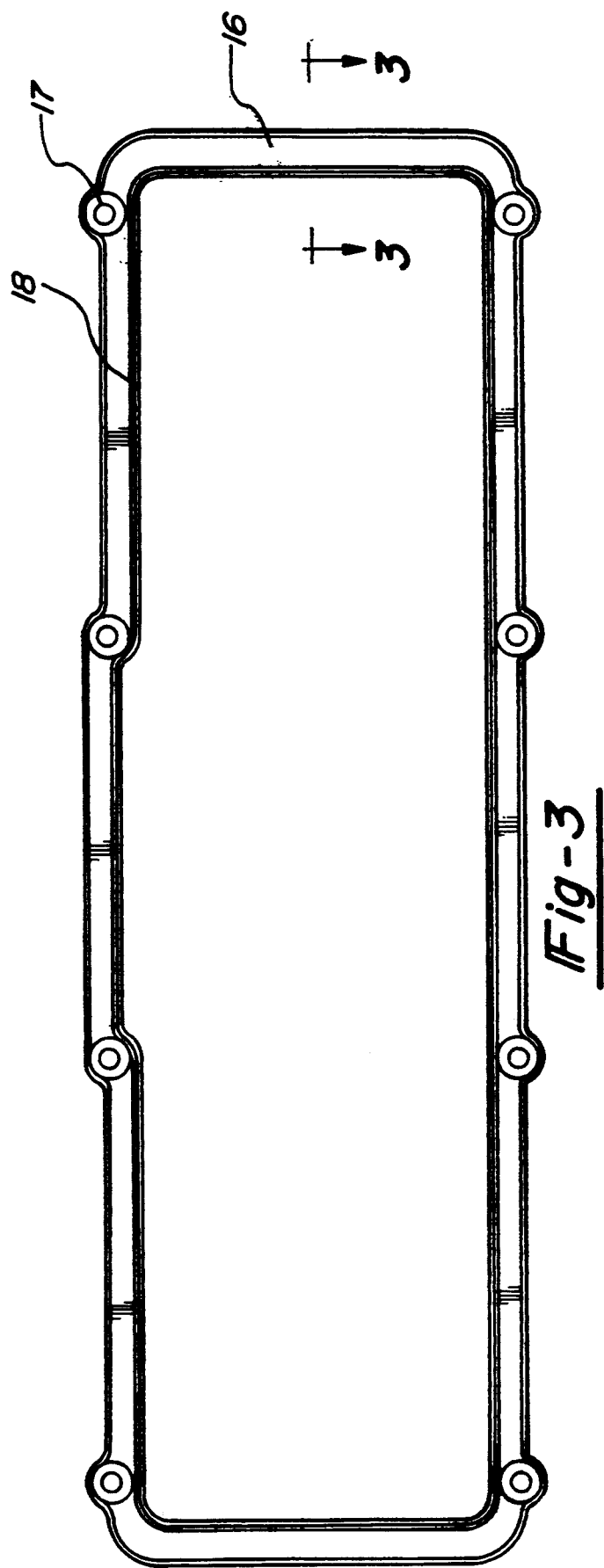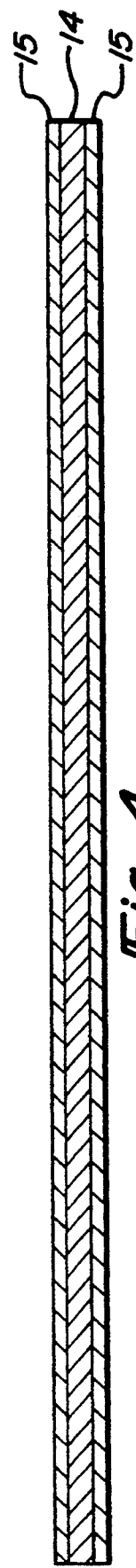

NON-STICK AUTOMOTIVE GASKETS

BACKGROUND OF THE INVENTION

The present invention relates to automotive gaskets, particularly to non-stick automotive gaskets and more particularly to gaskets which contain polymeric fluorocarbons on their surfaces to impart non-stick properties thereto.

Gaskets have been used to provide a seal between two engaging or mating parts. For example gaskets have been employed in internal combustion engines such as automobile and diesel engines. In these engines there is a need for gaskets which are adapted to be mounted between the engine head and block. These gaskets have a plurality of cylinder holes, a plurality of stud holes and a plurality of lubricant and coolant holes. These gaskets are held under compression between the cylinder block and a cylinder head and insures against leakage of fluids such as oil and coolant.

When these gaskets begin to deteriorate over a period of time, the oil and coolant will begin to leak around the holes for the oil and coolant and cause further corrosion of the gasket. Once a gasket begins to deteriorate, it is necessary to remove the gasket and insert a new gasket. Oftentimes, the gasket will disintegrate when the engine head and block are separated and parts of the gasket will adhere to the mating surfaces of each. It is often difficult to remove parts of the gasket from the engine head and block and generally, each of the mating surfaces have to be scraped in order to remove the gasket residue.

Gaskets having asbestos fibers and synthetic rubber on their upper and lower surfaces have been treated with polysiloxanes and silicone oil to help eliminate the tendency of the asbestos fibers to adhere to the respective opposite metallic surfaces of the cylinder head and the engine block. For example. U.S. Pat. No. 4,483,539 to Bindel et al discloses a head gasket having a plate of soft material which is first treated with a polysiloxane having a tendency to react with the OH groups of the asbestos fibers. A polysiloxane resin is then applied to the soft material and the soft material heated to polymerize the polysiloxane.

U.S. Pat. No. 4,826,708 to Udagawa discloses applying a seal coating to a base plate of a gasket. The seal coating may be a fluorocarbon polymer, a silicone polymer or a silicone gum.

U.S. Pat. No. 4,103,913 to McDowell discloses a metal gasket having a sealing bead of silicone sealant deposited on the top and/or bottom surfaces and at a position closely adjacent to the peripheral edges of the gasket body. Subsequent to the application of the silicone bead, the gasket body is coated at positions remote from the silicone bead with a mixture containing molybdenum disulfide and polytetrafluoroethylene.

U.S. Pat. No. 4,169,185 to Bhatia discloses a gasket consisting of a metallic base sheet having a sealant coating thereon consisting of a heat-cured, phenyl-substituted, hydrocarbyl-substituted polysiloxane resin having metallic powder dispersed therein.

It has been found that gaskets treated with silicone materials still have a tendency to adhere to the respective opposite metallic mating surfaces of an automotive internal combustion engine.

Therefore, it is an object of the present invention to provide gaskets which exhibit release properties from the respective metallic mating surfaces. Another object of the present invention is to provide gaskets having an improved seal to the respective metallic mating surfaces. A further object of the present invention is to provide a gasket having greater durability or stability. A still further object of the present invention is to provide a gasket having substantially higher temperature stability which results in an improved seal of the gasket surface.

SUMMARY OF THE INVENTION

The foregoing objects and others which will become apparent from the following description are accomplished in accordance with this invention, generally speaking, by providing non-stick automotive gaskets for internal combustion engines which comprises a base sheet having a resilient layer thereon which is impregnated with a saturant and coated with a polymeric fluorocarbon.

The non-stick automotive gasket containing a base sheet having a resilient layer thereon is prepared by applying a saturate containing dispersed polymeric fluorocarbons to the resilient layer. The saturant is absorbed by the resilient layer, leaving the polymeric fluorocarbon on the surface of the resilient layer.

BRIEF DESCRIPTION OF THE DRAWING

FIG. 3 is a prospective view of a non-stick automotive gasket.

FIG. 4 is a cross-sectional view taken along lines III—III in FIG. 3.

DESCRIPTION OF THE INVENTION

The non-stick automotive gasket comprises a base sheet having a resilient layer attached to the base sheet which is impregnated with a saturant and having a coating of polymeric fluorocarbon on the surface of the resilient layer. The polymeric fluorocarbon prevents the resilient layer from adhering to the cylinder block and cylinder head in an internal combustion engine and also prevents the liquid lubricants and coolants from leaking out.

Figure 1:
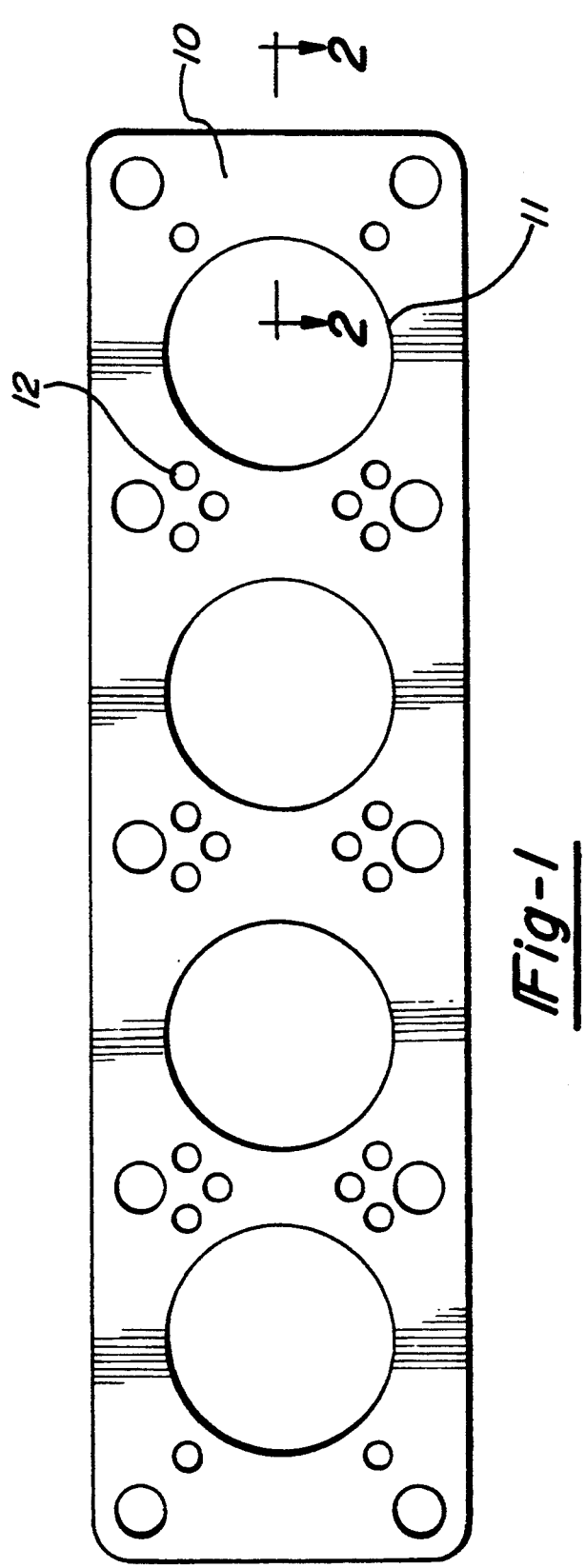
FIG. 1 is a prospective view of a non-stick automotive gasket.

Referring to FIG. 1, the gasket 10 consists of a base sheet which is preferably a flat metal member having a plurality of piston size apertures 11 and fluid flow passage ways 12 and having a resilient layer attached on the upper and lower surfaces of the sheet metal member.

Figure 2:
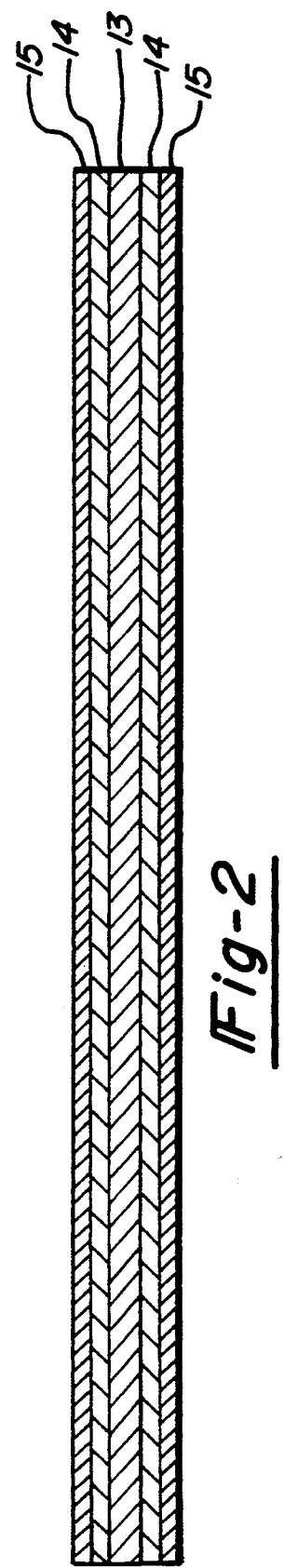
FIG. 2 is an enlarged cross sectional view taken along lines II—II in FIG. 1.

As shown in FIG. 2, the gasket 10 consists of a base sheet metal member 13 having a porous resilient layer 14 attached to the upper and lower surfaces of sheet metal member 13. The resilient layer 14 conforms to the base sheet metal member 13 and has a plurality of piston size apertures and fluid flow passage ways which correspond with the piston size apparatuses and fluid flow passage ways of the sheet metal member 13. The resilient layer 14 has a polymeric fluorocarbon coating 15 on its outer surface which prevents adhesion of the conforming surfaces which are in contact with gasket 10.

FIG. 3 is a top plan view of an engine gasket 16 of a generally rectangular configuration which is adapted to be received between two conforming surfaces of a vehicle engine. The gasket 16 is held in position by bolts which are received through bolt openings 17. The gasket inner surface 18 is exposed to hot oil which is being circulated in the engine.

FIG. 4 is a cross-sectional view of gasket 16 which consists of a porous resilient layer 14. The resilient layer 14 has a polymeric fluorocarbon coating 15 on its outer surfaces which prevents the gasket 16 from adhering to the two conforming surfaces which are in contact with the gasket.

The resilient material 14 may consist of a porous material impregnated with reinforcing fibers combined with synthetic rubber, and a variety of elastomeric materials including natural or synthetic rubbers, for instance EPDM, SBR, butyl nitrile, neoprene, urethanes, paper impregnated with a resin and the like. It is essential that the resilient material be capable of absorbing the saturant. The resilient material should be resistant to lubricant, coolant and high temperatures.

The sealant coating 15 on the surface of the resilient material 14 consists of particles of a polymeric fluorocarbon, in which the saturant, having small particles of a polymeric fluorocarbon dispersed therein is absorbed into the resilient material 14, leaving a sealant coating 15 of polymeric fluorocarbon on the surface of the resilient material 14.

The saturant may be any silicone composition in which the polymeric fluorocarbon is dispersed therein. Examples of suitable saturants are silicone fluids, such as organopolysiloxane fluids having the formula $$Z_n R_{3-n} SiO(SiRR'O)_x SiR_{3-n} Z_n \qquad (I)$$

where R is selected from the group consisting of monovalent hydrocarbon radicals having from 1 to 18 carbon atoms and substituted monovalent hydrocarbon radicals having from 1 to 18 carbon atoms, R' is the same as R or a hydrogen atom, Z may be the same as R' or a hydrolyzable group or atoms selected from the group consisting of hydroxyl groups (OH), hydrocarbonoxy groups (OR), hydrocarbonoxy-hydrocarbonoxy groups (OR''OR), aminoxy groups ($ONR'_2$), acyloxy groups (OOCR'), amine groups ($NR'_2$), oxime groups (ON=$CR'_2$), and acylamino groups [NR(COR')], in which R and R' is the same as above, R'' represents a divalent hydrocarbon radical having from 1 to 10 carbon atoms, n represents 0, 1, 2 or 3 and x represents zero or a positive integer such that the viscosity of the organopolysiloxane is in the range of from 5 to 100,000 mPa.s at 25° C. In the above formula, Z may be a hydrolyzable atom, such as a halogen atom and more preferably a chlorine atom.

In the above formula, R is a monovalent hydrocarbon radical having from 1 to 18 carbon atoms. Examples of monovalent hydrocarbon radicals represented by R are alkyl radicals, such as the methyl, ethyl, n-propyl, isopropyl, 1-n-butyl, 2-n-butyl, isobutyl, tert-butyl, n-pentyl, iso-pentyl, neo-pentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals such as the vinyl and allyl radicals; cycloalkyl radicals, such as the cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and β-phenylethyl radicals.

Examples of substituted monovalent hydrocarbon radicals represented by R having from 1 to 18 carbon atoms are halogenated radicals such as haloalkyl radicals, for example the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

Examples of preferred monovalent hydrocarbon radicals represented by R are alkyl radicals having from 1 to 4 carbon atoms such as the methyl, ethyl, propyl and butyl radicals.

It is preferred that at least 80% and more preferably, at least 90% of the R radicals be methyl radicals.

When the saturant is an organopolysiloxane fluid, it is preferred that the organopolysiloxane contain only radicals where Z is R, R' or hydroxyl groups.

In addition to the R R'SiO units, the organopolysiloxanes can also contain up to 90 mol percent of units of the formula $R_3SiO_{1/2}$, $RSiO_{3/2}$ and $SiO_{4/2}$, where R is the same as above.

The organopolysiloxanes can be homopolymers, i.e., only one species of siloxane unit is present or a copolymers containing two or more different species of siloxane units. The organopolysiloxanes can also be a mixture of homopolymers and/or copolymers.

The organopolysiloxanes may range in viscosity from about 5 mPa.s at 25° C. up to about 100,000 mPa.s at 25° C., preferably from 50 to about 50,000 mPa.s at 25° C. and more preferably from about 100 to 25,000 mPa.s at 25° C.

Examples of linear or branched organopolysiloxane fluids which may be employed as a saturant in the present invention are trimethylsiloxy-terminated dimethylpolysiloxanes, triethylsiloxy-terminated diethylpolysiloxanes, tripropylsiloxy-terminated dipropylpolysiloxanes, tributylsiloxy-terminated dibutylpolysiloxanes, trimethylsiloxy-terminated copolymers of dimethylsiloxane and methylvinylsiloxane units, trimethylsiloxy-terminated copolymers of dimethylsiloxane and methylphenylsiloxane units, trimethylsiloxy terminated dimethylsiloxane and methylhydrogensiloxane units, copolymers of dimethylhydrogensiloxane and methylhydrogensiloxane units, copolymers of dimethylhydrogensiloxane, dimethylsiloxane and methylhydrogensiloxane units.

Other organopolysiloxane fluids which may be employed as a saturant are cyclic siloxanes such as octamethylcyclotetrasiloxane, dodecamethylcyclohexasiloxane, tetradecamethylcycloheptasiloxane, hexadecamethylcyclooctasiloxane, and cyclic methylhydrogensiloxanes such as 2, 4, 6, 8-tetramethylcyclotetrasiloxane. Other saturants which may be employed are organopolysiloxane compositions which are curable to elastomers. Examples of curable organopolysiloxane compositions are those represented by formula (I) where R' is the same as R and Z is a hydroxyl group or the same or different hydrolyzable groups.

Hydrolyzable groups represented by Z can be the same hydrolyzable groups which have been or could have been present heretofore in the hydrolyzable silicone compounds generally used in the preparation of compositions which must be stored under anhydrous conditions but when exposed to moisture at room temperature or at elevated temperatures crosslink to form elastomers. Examples of suitable hydrolyzable groups represented by Z are hydrocarbonoxy groups (OR), hydrocarbonoxy-hydrocarbonoxy groups, (OR"OR), aminoxy groups (ONR'$_2$), acyloxy groups (OOCR'), amine groups (NR'$_2$), oxime groups (ON=CR'$_2$), and acylamino groups [NR(COR')], where R, and R' are the same as above and R" is a divalent hydrocarbon radical having from 1 to 10 carbon atoms.

In the above formula, R" is a divalent hydrocarbon radical having up to 10 carbon atom which is represented by the formula (CH$_2$)y, where y is a number of from 1 to 10. Examples of preferred divalent hydrocarbon radicals are ethylene, propylene, butylene, pentylene, hexylene, octylene and decylene radicals.

Examples of hydrocarbonoxy groups are especially alkoxy groups having from 1 to 10 carbon atoms, such as the methoxy, ethoxy, n-propoxy, isopropoxy, butoxy, hexyloxy, heptyloxy and octyloxy groups, as well as other hydrocarbonoxy groups having from 2 to 10 carbon atoms, such as vinyloxy, allyloxy, ethylallyloxy, isopropenyloxy, butadienyloxy and phenoxy groups.

An example of a hydrocarbonoxy-hydrocarbonoxy group is the methoxyethyleneoxy group.

Examples of aminoxy groups are dimethylaminoxy, diethylaminoxy, dibutylaminoxy, dioctylaminoxy, dicyclohexylaminoxy, diphenylaminoxy, ethylmethylaminoxy and methylphenylaminoxy groups.

Examples of amine groups are n-butylamino, sec-butylamino and cyclohexylamino groups.

An example of an acylamine group is the benzoylmethylamino group.

Examples of oxime groups are acetaldoxime, acetophenoxime, acetonoxime, benzophenonoxime, 2-butanonoxime, diisopropylketoxime and chlorocyclohexanonoxime groups.

Examples of acyloxy groups are acetoxy, propionyloxy, valeryloxy, caproyloxy, myristoyloxy and stearoyloxy radicals.

Examples of hydrolyzable atoms represented by Z are chlorine and hydrogen atoms.

Organopolysiloxane compositions which must be stored under anhydrous conditions, but when exposed to moisture at room temperature crosslink to form elastomers are prepared by mixing an organopolysiloxane of formula (I), where Z is a hydroxyl group with a crosslinking agent having an average of more than 2 hydrolyzable groups or atoms per molecule. Examples of suitable crosslinking agents are methyltriacetoxysilane, methyltris(cyclohexylamino)-silane, methyltris(2-butanonoximo) silane, mixtures of methyltris-(cyclohexylamino)silane and methyl-tris(2-butanonooxime)silane, methyl(tert-butoxy)acetoxysilane having a total of 3 tert-butoxy and acetoxy groups per molecule, methyltrimethoxysilane, methyltriethoxysilane, methyltriaminoxysilane and ethyltriaminoxysilane.

Crosslinking agents which may be employed in the compositions of this invention just prior to use when the compositions are stored above −15° C. are hexaethoxydisiloxane and an ethylpolysilicate having an SiO$_2$ content of about 40% by weight.

The crosslinking agents can be present in the compositions of this inventions in the same amounts as have been used heretofore to form crosslinked organopolysiloxanes.

The amount of crosslinking employed may vary over a wide range and may range from about 0.5 to 10% by weight and more preferably may range from 1 to 5% by weight based on the weight of the organopolysiloxane.

The crosslinking agents may be omitted from the compositions when they are crosslinked by high energy radiation, such as alpha-, beta- or gamma radiation.

Generally a catalyst is not necessary in all cases in order to obtain satisfactory crosslinking. However when crosslinking is desired, catalysts may be employed in these compositions to accelerate crosslinking of these compositions after they have been applied to resilient materials. Examples of suitable catalysts which may be employed are condensation catalysts such as tin salts or organotin compounds of carboxylic acids, for example dibutyltin dilaurate, tin octoate, lead octoate, iron stearate, aluminum octoate, tin oleate, dibutyltinbutoxychloride and the like.

The amount of catalyst employed may range from 0 to about 2% by weight and more preferably from about 0 to about 1% by weight based on the weight of the composition. A mixture of two or more of the catalysts may be employed, if desired.

Other crosslinking agents which may be incorporated in the compositions of this invention are organic peroxides such as benzoyl peroxide, dicumyl peroxide and bis(2,4-dichlorobenzoyl)peroxide.

Examples of other crosslinking agents which can be employed in the compositions of this invention are methylhydrogenpoly-siloxanes and catalysts which promote the addition of Si-bonded hydrogen to Si-bonded aliphatic unsaturated groups.

When methylhydrogenpolysiloxanes are employed as crosslinking agents, it is preferred that Z in formula (I) be a monovalent hydrocarbon radical having aliphatic unsaturation, and preferably R' is a monovalent hydrocarbon radical in which some of the groups may have aliphatic unsaturation.

More specifically, the organopolysiloxane is a diorganopolysiloxane having the general formula

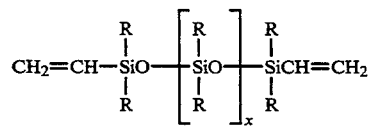

where R is the same as above and x is a number such that the organopolysiloxane has a viscosity of from about 5 to 100,000 mPa.s at 25° C.

The organopolysiloxanes employed in the compositions of this invention are produced by hydrolysis and condensation of the corresponding hydrolyzable silanes. These organopolysiloxanes are preferably linear polymers containing diorganosiloxane units of the formula R$_2$SiO; however, these polymers may also contain minor amounts of other units such as RSiO$_{3/2}$ units, R$_3$SiO$_{0.5}$ and SiO$_{4/2}$ units in which R is the same as above.

The organohydrogenpolysiloxanes employed in the compositions of this invention generally consist of units of the general formula

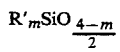

where R' represents hydrogen, a monovalent hydrocarbon radical or a halogenated monovalent hydrocarbon radical having from 1 to 18 carbon atoms, in which at least two and preferably three Si-bonded hydrogen atoms are present per molecule and m is 1, 2 or 3. Preferred compounds are those consisting of RSiO-units, $R_2SiO$- and $R_3SiO_{0.5}$ units, in which an Si-bonded hydrogen atom is present for each 3 to 100 silicon atoms and R is the same as above. It is preferred that the organohydrogenpolysiloxanes have a viscosity of from about 5 to 50,000 mPa.s and more preferably from 100 to 20,000 mPa.s at 25° C.

The organohydrogenpolysiloxanes may also contain monovalent hydrocarbon radicals having aliphatic unsaturation as well as Si-bonded hydrogen atoms in the same molecule.

It is preferred that the organohydrogenpolysiloxanes contain from 0.002 to about 1.7% by weight of Si-bonded hydrogen atoms, and the silicon valences not satisfied by hydrogen atoms or siloxane oxygen atoms are satisfied by unsubstituted or substituted monovalent hydrocarbon radicals free of aliphatic unsaturation. The organohydrogenpolysiloxanes having an average of at least 2 Si-bonded hydrogen atoms per molecule are preferably present in the compositions of this invention in an amount of from about 0.1 to about 15 Si-bonded hydrogen atoms per aliphatically unsaturated group.

The platinum catalyst employed in this invention may consist of finely dispersed platinum as well as platinum compounds and/or platinum complexes which have been used heretofore to promote the addition of Si-bonded hydrogen atoms to compounds having aliphatically unsaturated groups.

Examples of catalysts which can be used in this invention are finely dispersed platinum on carriers, such as silicon dioxide, aluminum oxide or activated charcoal, platinum halides, such as $PtCl_4$, chloroplatinic acid and $Na_2PtCl_4.nH_2O$, platinum-olefin complexes, for example, those with ethylene, propylene or butadiene, platinum-alcohol complexes, platinum-styrene complexes such as those described in U.S. Pat. No. 4,394,317 to McAfee et al, platinum-alcoholate complexes, platinum-acetylacetonate, reaction products comprising chloroplatinic acid and monoketones, for example, cyclohexanone, methyl ethyl ketone, acetone, methyl-n-propyl ketone, diisobutyl ketone, acetophenone and mesityl oxide, as well as platinum-vinylsiloxane complexes, with or without a detectable amount of inorganic halogen. The platinum-vinylsiloxane complexes are described, for example, in U.S. Pat. Nos. 3,715,334; 3,775,452 and 3,814,730 to Karstedt.

Mixtures of various platinum catalysts, for example, a mixture consisting of the reaction product of chloroplatinic acid and cyclohexanone and a Platinum-divinyltetramethyldisiloxane complex which is free of detectable inorganic halogen may be used in the compositions of this invention.

The platinum catalyst is generally employed in an amount of from about 0.5 to 300 ppm by weight and more preferably from about 2 to 50 ppm by weight calculated as platinum and based on the weight of the silicon compounds.

The saturant containing finely dispersed polymeric fluorocarbons is applied to the resilient material 14. The saturant is absorbed into the matrix of the resilient material leaving a coating thereon of finely divided polymeric fluorocarbon. Of the many polymeric fluorocarbons which are commercially available and which are suitable for this invention are, for example, the various types of polytetrafluoroethylene such as "Teflon TFE", "Hostaflon TF", "Teflon TFP", "POLYMIST ®", etc.

The polymeric fluorocarbon particles are dispersed in the saturant in an amount of from 0.5 to 50% by weight, preferably from 1 to 20% and more preferably from 2 to 10% by weight based on the weight of the composition, i.e., the weight of the saturant and the polymeric fluorocarbon particles.

Preferably the polymeric fluorocarbon particles have an average particle diameter of from about 0.1 to about 800 μm and more preferable have an average particle diameter of from about 3 to 600 μm.

Examples of other additives which can be present in the compositions of this invention other than the organopolysiloxanes, crosslinking agents and polymeric fluorocarbons particles, if desired are organopolysiloxane resins including those made of $(CH_3)_3SiO_{1/2}$ and $SiO_{4/2}$ units, corrosion inhibitors, oxidation inhibitors, heat stabilizers, solvents, agents which improve the adhesion of the elastomers prepared from the compositions of this invention to the resilient layer, such as 3-(2-aminoethylamino)propyltrimethoxysilane or reaction products of 3-(2-aminoethylamino)propyltrimethoxysilane with dimethylpolysiloxanes containing Si-bonded hydroxyl groups, inhibitors which prevent premature crosslinking of Si-H and Si-vinyl systems such as benzotriazole, 1,3-divinyl-1,1,3,3-tetramethyldisiloxane, and acetylenic alcohols, such as 2-methyl-3-butyn-2ol.

Preferable the saturant does not contain any reinforcing or non-reinforcing fillers except for the polymeric fluorocarbon particles. However, if reinforcing fillers are incorporated in the saturant, they are preferably selected from pyrogenically produced silicon dioxides, dehydrated silicic acid hydrogels and other types of precipitated silicon dioxide having a surface area of at least 50 m²/g. Other reinforcing fillers which may be employed, if desired, are titanium dioxide, ferric oxide, aluminum oxide and zinc oxide having a surface area of at least 50 m²/g.

If non-reinforcing fillers are employed, they are preferably selected from quartz meal, diatomaceous earth, Neuburg chalk, calcium silicate, zirconium silicate, calcium carbonate, e.g., in the form of ground chalk, calcined aluminum silicate and powdered sodium aluminum silicate having a surface area of less than 50 m²/g.

If reinforcing or non-reinforcing fillers are incorporated in the saturant, they can, for example, be treated with trimethylethoxysilane or stearic acid to impart hydrophobic properties thereto. If desired, such treatment can be carried out in advance, for example, in a ball mill.

The amount of reinforcing and non-reinforcing fillers employed in the saturant may range from about 0 to about 60% by weight and more preferably from 0 to about 40% by weight based on the weight of the composition. As mentioned heretofore, preferably the saturant does not contain any reinforcing or non-reinforcing fillers.

In some cases, it may be desirable to employ a diluent in the saturant. The diluent should be inert to the reactants and catalyst, when present. Examples of suitable diluents are organic solvents which vaporize at low temperatures. Examples of suitable organic solvents are chlorinated hydrocarbons such as trichloroethylene. When organic solvents are employed they are preferably employed in an amount of less than 20% by weight based on the weight of the saturant.

In preparing the compositions of this invention, the components can be mixed in any sequence. Preferably, the components are mixed at room temperature, although higher temperatures may be employed providing the higher temperatures do not crosslink the saturant prior to its application to the resilient layer. Crosslinking of the compositions can be accomplished in any conventional manner at room temperature or at temperatures above or below room temperature.

The saturants are preferably applied to the resilient layer 14 of a gasket by brushing, dipping or spraying. The saturant is allowed to penetrate the resilient layer, leaving a polymeric fluorocarbon coating on the outer surfaces of the resilient material. If the saturant is a crosslinkable composition, the composition may be crosslinked by exposure to atmospheric moisture and/or at an elevated temperature. A coating thickness of about 0.005 mm has produced satisfactory results.

The saturant of this invention can be used on gasket materials which do not contain a base metallic sheet 13 to prevent adhesion of the gasket material to the mating parts. An example of a suitable gasket without a base material is shown in FIG. 3. A cross-sectional view of the gasket of FIG. 3 is shown on line III—III in FIG. 4. This invention is especially useful in forming gaskets which are used in internal combustion engines. In the following examples all parts are by weight and all temperatures are at 25° C. unless otherwise specified.

EXAMPLE 1

A saturant is prepared by mixing 250 parts of a vinyl terminated dimethylpolysiloxane fluid having a viscosity of 4,000 mPa.s at 25° C. with 0.25 parts of a platinum solution containing 1 part of chloroplatinic acid in 19 parts of ethanol. About 25 parts of polytetrafluoroethylene having a particle size average diameter of about 3 μm (available from Allied Chemical Corporation as POLYMIST®F-5A) are added to the mixture and then 10 parts of a methylhydrogenpolysiloxane fluid having a viscosity of 50 mPa.s at 25° C. and about 0.23 weight percent of silicon bonded hydrogen are added and mixed for about 5 minutes. A coating is applied to the resilient layer 14 of a gasket and cured at room temperature. When the gasket is mounted between an engine head and block of an internal combustion engine, is able to withstand a substantial compressive load or stress and is easily separated from the engine head and block without disintegration.

EXAMPLE 2

About 130 parts of a dimethylpolysiloxane having an Si-bonded hydroxyl group in each of its terminal units and having a viscosity of 4,000 mPa.s at 25° C. are mixed under anhydrous conditions with 46 parts of a trimethylsiloxy end-blocked dimethylpolysiloxane which has a viscosity of 100 mPa.s at 25° C., 70 parts of polytetrafluoroethylene having an average particle size of from 275 to 575 μm (available from E.I. dupont as Teflon®60) and 12 parts of methyltriacetoxysilane. The resultant composition is applied to the resilient layer 14 of a head gasket and exposed to atmospheric moisture for 2 hours. A coating is formed on the resilient layer, which when mounted between an engine head and block of an internal combustion engine, is able to withstand a substantial compressive load and stress and is easily separated from the engine head and block without disintegration.

EXAMPLE 3

About 116 parts of a dimethylpolysiloxane having a Si-bonded hydroxyl group in each terminal unit and a viscosity of 10,000 mPa.s at 25° C. are mixed under anhydrous conditions with 54 parts of a trimethylsiloxy end-blocked polysiloxane which has a viscosity of 100 mPa.s at 25° C. and 75 parts of polytetrafluoroethylene particles having an average diameter of from 350 to 650 μm (available from E.I. dupont as Teflon®6). To the resultant mixture is added with mixing 9 parts of methyltris(cyclohexylamino)silane. The resultant mixture is applied to a resilient layer 14 of a head gasket and exposed to atmospheric moisture for 2 hours. The gasket is mounted between an engine head and block of an internal engine. The gasket is easily separated from the engine head and block without disintegration.

EXAMPLE 4

The procedure of Example 3 is repeated except that 116 parts of a dimethylpolysiloxane having trimethylsiloxy terminal units and a viscosity of 50,000 mPa.s at 25° C. are substituted for the dimethylpolysiloxane having Si-bonded hydroxyl group in each terminal unit. Also, the 9 parts of methyltris-(cyclohexyl-amino)silane are omitted. The dimethylpolysiloxane is absorbed into the resilient layer leaving a polytetrafluoroethylene coating on the surface of the resilient layer.

What is claimed is:
1. A non-stick automotive gasket, which comprises;
A. a resilient material and
B. a polymeric fluorocarbon coating formed by a dispersion, consisting of:
   i. a saturant, wherein the saturant is a silicone composition in which polymeric fluorocarbon particles can be dispersed,
   ii. from 0.5 to 50% by weight:, based on the weight of the dispersion of said polymeric fluorocarbon particles having an average diameter of from 0.1 to 800 μm and
   iii. from 0 to 60% by weight based on the weight of the dispersion coating of a filler.
2. The gasket of claim 1, wherein the saturant is a silicone composition having a viscosity of from 5 to 100,000 mPa.s at 25° C.
3. The gasket of claim 2, wherein the silicone composition is a silicone fluid.
4. The gasket of claim 2, wherein the silicone composition contains an organopolysiloxane fluid which is capable of being crosslinked.
5. The gasket of claim 2, wherein the silicone composition contains an organopolysiloxane having terminal Si-bonded hydroxyl groups.
6. The gasket of claim 2, wherein the silicone composition contains an organopolysiloxane having Si-bonded aliphatic unsaturation, an organohydrogenpolysiloxane having Si-bonded hydrogen groups.

* * * * *